May 30, 1967 M. J. DUFFICY 3,322,017
TRUSS CONNECTOR PLATE WITH SELF-CRIMPING TOOTH
Filed Jan. 11, 1965 2 Sheets-Sheet 1
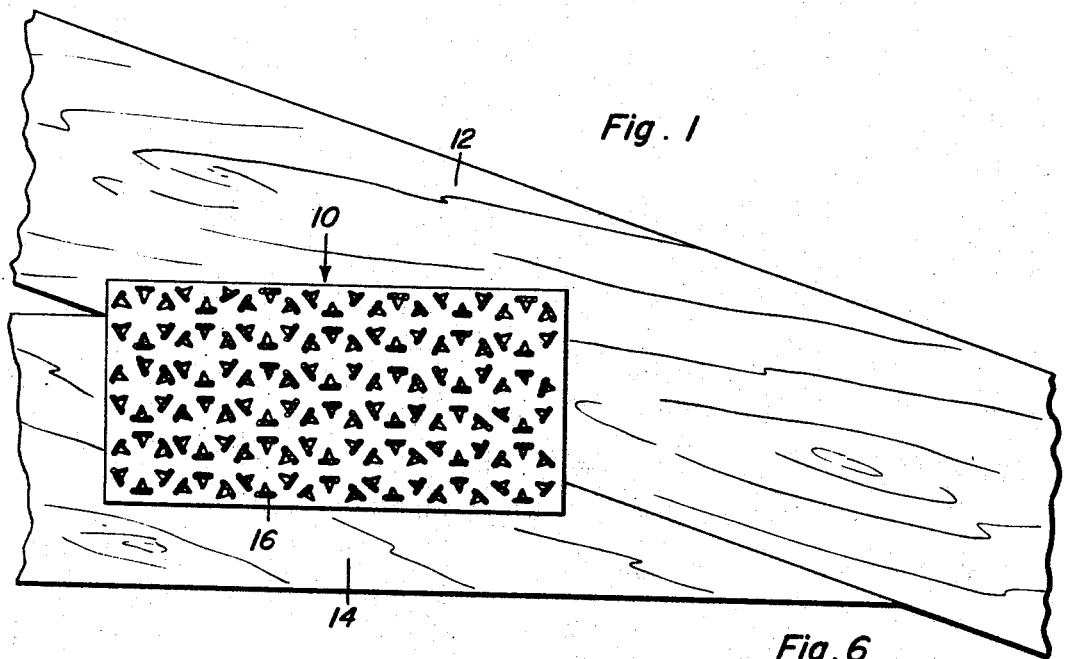
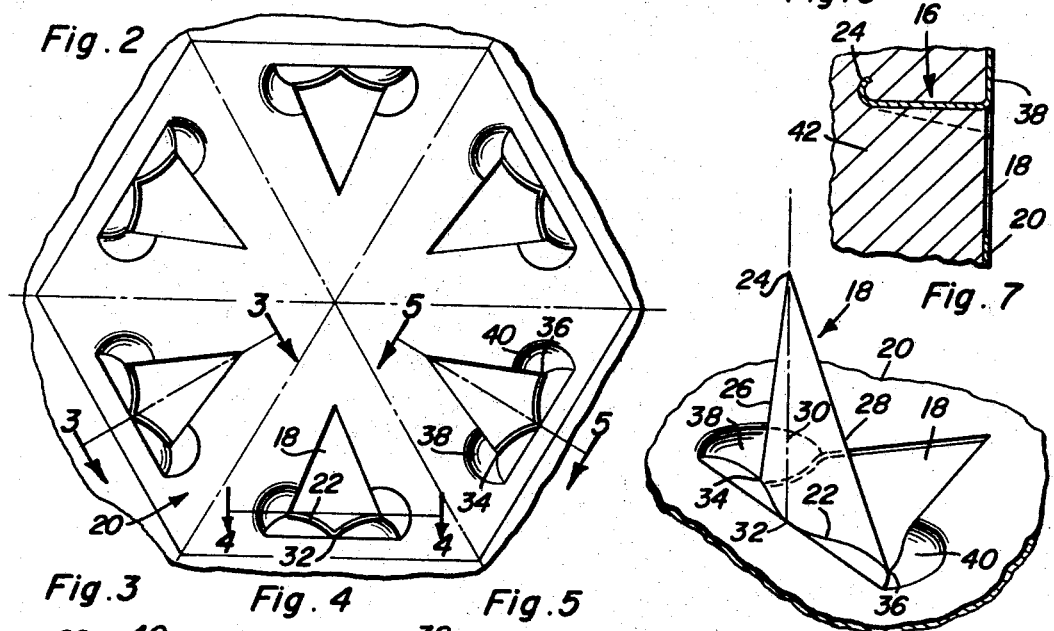
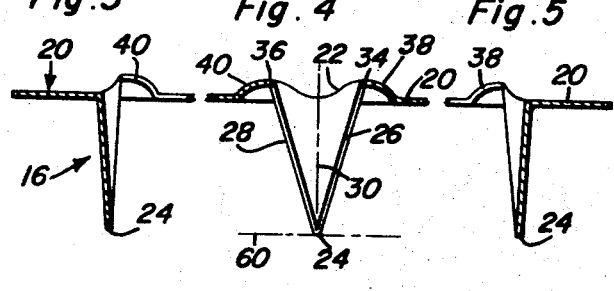
Maurice J. Dufficy
INVENTOR.

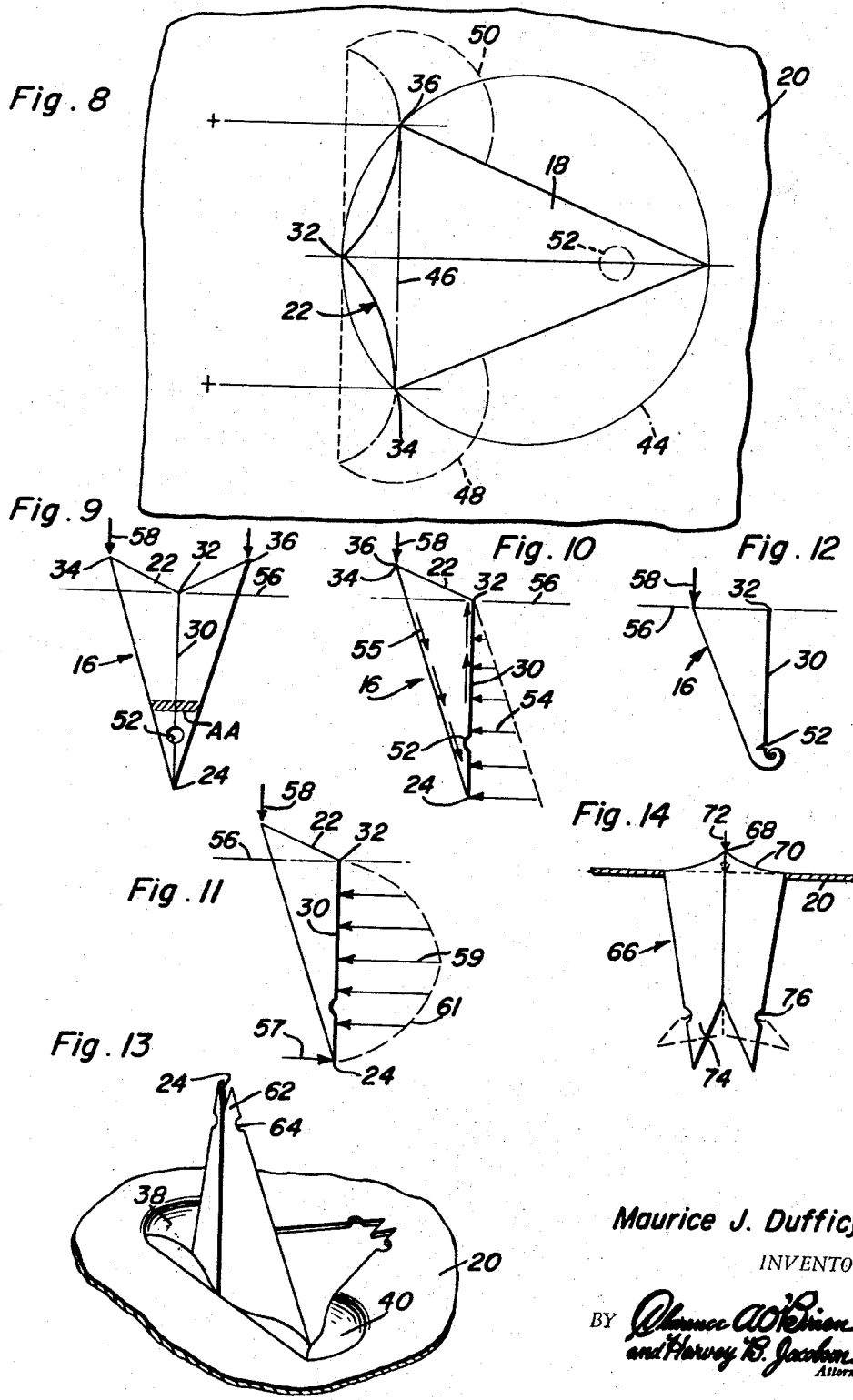

United States Patent Office 3,322,017
Patented May 30, 1967

3,322,017
TRUSS CONNECTOR PLATE WITH
SELF-CRIMPING TOOTH
Maurice J. Dufficy, 3205 Dow St.,
Pompano Beach, Fla. 33062
Filed Jan. 11, 1965, Ser. No. 424,652
8 Claims. (Cl. 85—13)

This invention relates to connectors for structural members and more particularly to a plate connector made of a relatively hard material or metal adapted to be fastened to abutting structural members such as wooden beams so as to securely hold such structural members in rigid abutting relationship to form such structural entities as roof trusses.

Plate connectors of the aforementioned type are well known and many variations thereof have been proposed as solutions to several problems which arise. Some connectors are secured to the structural members by nails or long projecting teeth which deeply penetrate the material or wood and cause splitting thereof or otherwise disrupt the wood fibers so as to seriously weaken the structural strength of the members and the joint established by the connector. Also, resistance of wood to penetration by the connectors sometimes results in column failure of the long tooth connectors. Where penetration is insufficient, on the other hand, the connection fails because of withdrawal from the wood under load. Also, the lateral forces applied to the connector teeth by axial loading of the structural members being joined, tend to cause crushing of the wood fibers at the surface region followed by bending of the teeth of the connector and the resultant development of withdrawal stresses. Failure of the connector may thereby occur either because of withdrawal from the wood or because of excessive tension upon the metal section of the connector.

Attempts to solve the foregoing problems have been made by prescribing longer teeth, by deflecting shorter teeth as they are embedded in the wood and tilting shorter teeth after substantial penetration by corrugating the plate surface. Obviously, lengthening of the teeth would prevent withdrawal at the expense of splitting the wood. Mere deflection or curvature of the teeth when being embedded in the wood, is usually unpredictable in result and any increase in withdrawal strength is questionable since the connector can withdraw along the gently curved penetration path established perhaps more readily than it could from a straight penetration path. With teeth tilted without substantial distortion, the chance of withdrawal is heightened by an enlargement of the volume of the embedded tooth space because of tooth tilting.

It is therefore a primary object of the present invention to provide a connector which will successfully cope with the aforementioned problems without any compromise. Further, the connector made and applied in accordance with the present invention is provided with several features which mutually cooperate to avoid unnecessary structural weakening of the structural material or wood, prevent withdrawal under load and crushing of the surface region of the wood fibers under the connector.

An important object of the present invention is to provide a connector having projecting teeth, the tip portions of which curl or crimp in response to forces causing penetration of the teeth into the wood to thereby prevent withdrawal of the connector. In accordance with the present invention, several features of the connector construction cooperate to produce the aforementioned curling restricted to the tip portion of the tooth. Curling of the tip portion may be effected by a redistribution of the resisting stresses in the wood produced by forces tending to cause angular displacement of the tooth relative to the connector plate portion as it penetrates the wood in cooperation with the particular profiling of the tooth by virtue of which its bending section modulus is varied from the base to the tip of the tooth. The tooth body may also be formed with a double curvature which diminishes from maximum curvature at the base portion of the tooth toward flatness at the tip portion so as to develop elastic, membrance analogy edge stresses adjacent the tip portion as the tooth penetrates the wood. The stress concentrations so developed adjacent the tip portion augment the curling thereof. The tooth body may also be weakened so as to enhance curling of the tip portion by discrete placement of weakening apertures or cutouts in the tooth body. Curling of the tip portion may be further used to advantage by formation of the tip portion into two pointed sections which converge or diverge as a result of the curling in order to more firmly grip or grasp the wood fibers.

An additional object of the present invention is to provide a connector having teeth which are so joined to the connector plate portion as to prevent buildup of fiber crushing stresses in the critical surface region of the wood within which the connector teeth are embedded. Accordingly, the tooth base is made wider than the tooth tip so as to reduce the resisting stresses in the wood at the surface region and curved to develop tooth stiffness as well as to enable an appreciable portion of the base to be deformed from the general plane of the connector plate prior to installing the connector. The foregoing feature is also necessary to cause the tooth tip to curl when installed. Thus, the increased tooth stiffness prevents buildup of wood stress at the tooth base by distribution thereof over a greater area when the structural member is subjected to an axial load. Stiffness may also be enhanced when the tooth is provided with a double curved surface such as a conoid rather than a flat or developable surface.

A still further object of the present invention is to provide a method of forming the penetrating teeth from a connector plate by cutting the converging sides of a triangular tongue and folding the triangular tongue away from the plate portion along a reentrant curve which is tangent to the base of the triangle where it intersects the cutout sides. In this fashion, tearing of the base corners of the tooth are avoided when folding the tooth along the curve juncture. The curvature of the juncture is also selected so that the folded triangular tongue or tooth will be provided with a concavity that is maximum at its base and diminishes toward a relatively flat tip portion in order to produce the stress concentrations which augment curling of the tip portion as aforementioned. The triangular tooth may be formed thereby with various different double curvatures or formed with angularly related portions intersecting along a line of maximum concavity extending from the tip portion to the point at which the reentrant juncture curve is tangent to the general surface plane of the plate portion from which the tooth projects. The plate portion may then be deformed at the intersection of the tooth base with the sides. These deformed portions of the plate may therefore be flattened when the connector is pressed against the wood surface causing the projecting tooth to curl as aforementioned. The tooth body concavity may be of any suitable type as long as it diminishes toward the tip portion. One preferred configuration in accordance with the present invention is a conoid.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the connector plate interconnecting two wooden beams of a roof truss.

FIGURE 2 is an enlarged top plan view of a portion of the connector plate, prior to installation.

FIGURE 3 is a partial section view taken substantially through a plane indicated by section line 3—3 in FIGURE 2.

FIGURE 4 is a partial section view taken substantially through a plane indicated by section line 4—4 in FIGURE 2.

FIGURE 5 is a partial section view taken substantially through a plane indicated by section line 5—5 in FIGURE 2.

FIGURE 6 is a partial section view similar to that of FIGURE 3 or 5 but showing a portion of the connector plate installed in the wooden structural member.

FIGURE 7 is a partial perspective view of a portion of the connector member shown in FIGURES 2–5.

FIGURE 8 is a further enlarged top plan view of a portion of a connector having a modified form of tooth.

FIGURES 9 through 12 are diagrammatic views showing the action involved in connection with the penetration of the connector teeth into the wood.

FIGURE 13 is a perspective view of a portion of a connector having a further modified form of tooth.

FIGURE 14 is a sectional view through a connector showing yet another form of tooth.

Referring now to the drawings in detail, it will be observed from FIGURE 1, that the abutting wooden beams 12 and 14 are interconnected by a connector generally referred to by reference numeral 10 firmly secured to the coplanar surface formed by the abutting structural members 12 and 14. Connectors of this type may be applied to both sides of the abutting structural members and held in place by embedment of a plurality of teeth 16 which project from the connector. For nominally 2″ lumber, it has been found that optimum penetration of the wood by teeth 16 is 0.40 inch ±0.10 inch, where teeth constructed in accordance with the present invention are utilized.

Referring now to FIGURES 2–7, it will be observed that the teeth 16 project as triangular tongues folded from cutouts 18 in the generally flat plate portion 20 of the connector. Each tooth includes a wide base portion joined to the plate portion 20 along a curve juncture 22 and a tip portion 24 remote from the plate portion 20. In view of the curvature of the juncture 22, the base portion of the tooth is connected to the tip portion 24 by a body portion having a smooth, non-planar transition curvature between the converging edges 26 and 28, the curvature diminishing toward the tip portion 24. The maximum relative displacement of the tooth lies along a line 30 which extends from the tip portion 24 to a bearing point 32 at which the juncture 22 and the plate portion 20 are tangent lying between the base corners 34 and 36 of the tooth. The plate 20 is deformed at the base corners 34 and 36 so that prior to installation of the connector, the base corners 34 and 36 respectively lie on raised portions 38 and 40. When the connector is applied to the structural member, by lateral forces causing penetration of the wood material 42 by the teeth, the deformed portions 38 and 40 are flattened as shown in FIGURE 6 resulting in the curling or crimping of the tip portion 24 as will be hereafter explained. It is this curling of the tip portion, that prevents withdrawal of the connector from the wood 42 and it is the relatively wide dimension of the tooth base that prevents the tooth from tilting rather than curling at the tip.

Referring now to FIGURE 8, it will be observed that the cutout 18 is formed within a circle 44 on the plate portion which circumscribes the triangle that forms the edges 26 and 28 of the tooth folded or struck out from the plate portion 20. It will also be observed, that the triangular tongue forming the tooth is not folded along the base 46 of the triangle but rather along the curved juncture 22 as aforementioned. The juncture is formed along a reentrant curve which is tangent to the plate portion at point 32 so that when the triangular tongue is folded therealong, it will assume a corresponding double curvature. The curve forming the juncture 22 is tangent to the base 46 at corners 34 and 36 lying on the circumscribing circle 44, the point 32 also lying on said circumscribing circle. Accordingly, ripping of the corners 34 and 36 is avoided when folding the triangular tongue away from the plate portion so that it may extend laterally from one side of the plate portion. The corners 34 and 36 also form the centers of the circles 48 and 50 to which deformation of the plate portion is confined so that the corners 34 and 36 of the base will be spaced farthest from the general plane of the plate portion 20 prior to installation of the connector. The tooth struck out from the plate portion as shown in FIGURES 9 and 10, may be modified by providing a weakening aperture 52 adjacent to the tip portion 24 so as to augment curling of the tip portion when the tooth penetrates the wood.

The tooth curling action and forces involved may be analyzed with reference to the simplified version of a tooth as depicted in FIGURES 9 through 12. These figures diagrammatically illustrate the tooth 16 formed from triangular portions intersecting along line 30 at an angle. Accordingly, it will therefore be observed from FIGURE 9, that the unit bearing area through which resisting stress is applied to the tooth, increases from zero at tip 24 to a maximum value at the base of the tooth embedded in the wood. It will also be apparent, that since the cross-sectional area of the tooth also increases from zero at the tip 24 to a maximum amount at the base, there is a corresponding variation in the section modulus or strength of the tooth resisting bending. When tooth embedding force is applied to the plate portion 20 of the connector, tooth penetration forces 58 will be transmitted to the tooth 16 at points 34 and 36 tending to cause angular displacement of the tooth about the bearing point 32. Thus, prior to flattening of the plate portions 38 and 40 aforementioned, against the surface region 56 of the wood, unit resisting stresses 54 will be distributed as shown in FIGURE 10 which increase from the bearing point 32 toward the tip 24. The unit resisting stresses assume such a distribution so as to resist the eccentric loading of the tooth 16 by the force 58 tending to angularly displace the juncture 22 toward the surface region 56 of the wood. Further, boundary stress concentrations 55 are induced because of the non-prismatic form of the tooth, i.e., the variation in section modulus or strength aforementioned. A resultant horizontal component of the boundary stress concentrations indicated by reference numeral 57 in FIGURE 11, is therefore concentrated at the tooth tip 24. In view of the resultant horizontal stress concentration and the eccentricity of the force 58, the unit resisting stresses 54 are generally distributed as shown in FIGURE 10 for example. However, inasmuch as the unit resisting stresses are applied to incremental areas ΔA as explained with reference to FIGURE 9, the total resisting stresses 59 will be generally distributed as illustrated in FIGURE 11. It should be appreciated at this point, that the actual shape of the stress distribution curve 61 may be varied as required by changing the angular attitude of the sides 26 and 28 to one another and/or by using curved tooth sides.

If a tooth having a constant section modulus were utilized, it would bend under the load of the force 58 to a curvature prescribed by the stress distribution. However, in view of the non-prismatic nature of the tooth in the present case, the curvature assumed by the tooth because of the resisting stress distribution, is sharply confined to the tip region. Also, since the unit stress 54 is highest at the tip region and the horizontal component 57 of the boundary stress is concentrated at this region, where the wood bearing area approaches zero, an unstable stress pattern results in which the yield strength of the wood and the metal of the tooth will be exceeded causing curling of the tooth as depicted in FIGURE 12, until a stable configuration is achieved. At this point, it will become apparent that the initial stress pattern need only curl the tooth by a relatively small amount because once curling is initiated, continued application of the tooth insertion force 58 increases the curling action as the curving of the tip portion increases the bearing area against which resisting forces are applied. It should also be apparent from the foregoing, that substantially no tilting of the tooth occurs so that the energy available for distorting the tooth is only locally effective to curl the tooth tip as shown in FIGURE 12. This occurs because the resultant of the total resisting stresses 59 is located at a region of the tooth where the unit stress of the wood is relatively low.

By providing a weakening aperture 52 as indicated in FIGURES 9 through 12, boundary stresses are further restricted to the tooth edge and the section modulus of the tooth is weakened at a critical point to augment the curling action. Also, by making the juncture 22 curved, the plate bearing area is more rapidly increased in the event the plate portion of the connector is depressed into the wood surface 56 and will cause an increase in the tooth upward boundary stress area, to thus further restrict the downward boundary stress area to the tooth tip portion. When using a double curved surface for the tooth body, the boundary stress concentration becomes pronounced and the resistance to bending in the main body increases. The double curved surfaces therefore in themselves tend to curl intersecting edges without eccentric load. The conoid surface which varies in curvature from a straight line 60 as shown in FIGURE 4 (zero curvature) to practically any desired curvature, is particularly adaptable for the tooth body wherein the tip portion of the tooth approaches zero curvature. Zero curvature at the tip portion thereby reduces the ability of the tip to resist curling while maximum curvature of the tooth body at the base portions prevents distortion of the main body of the tooth. The stiffness inherent in a double curved type of tooth body is also advantageous in resisting bending of the tooth body under stresses induced by axial loads on the wood members being connected. By avoiding bending of the tooth body, along a major portion thereof, the build-up of unit stresses at the surface region of the wood is avoided to thereby eliminate crushing of the wood which has heretofore resulted in axial tensioning rather than shear upon the tooth cross-section quickly followed by failure of the joint. Minimizing of this latter effect by the double curvature of the connector tooth results therefore in a greatly increased allowable load on the connector prior to failure.

FIGURES 13 and 14 illustrate modified forms of connector teeth. In FIGURE 13, the non-prismatic tooth profile of the connector tooth causes convergence of the tip portion 62 as part of the curling action as compared to the curling shown in FIGURE 12. In the form of the tooth illustrated in FIGURE 14, the tip portions 74 diverge as shown by dotted line when the central portion of the tooth is urged downwardly by the tooth penetrating force 72 concentrated upon a single high point 68 tending to flatten the juncture 70 joining the plate portion 20 and the tooth. The tooth 66 is thereby urged upwardly at its outer edges because of the pressure of the main body of the plate 20 upon the wood surface. The shear stresses so produced are relieved by the tooth deformation as shown by dotted lines in FIGURE 14. Also, the convergence or divergence of the tip portions of the connector teeth as shown in FIGURES 13 and 14, may respectively be augmented by proper placement of the weakening cutouts 64 and 76 along the edges of the connector teeth respectively shown in FIGURES 13 and 14.

The curling action described with respect to FIGURES 13 and 14 may also be accomplished where the tooth body is provided with a flat profile. In each form of tooth described however, the tooth inserting force is applied to a portion of the juncture joining the tooth body and the flat plate portion in order to eccentrically load the tooth body in order to cause distortion thereof only at the tip portion. The plate portion may also be raised at locations adjacent to but spaced from the juncture joining the tooth body and the plate portion so that after the raised portions are flattened, continued application of the tooth insertion force will indent the area of the plate portion incorporating the base corners of the tooth in order to exert a force resulting in tooth tip curling similar to the action described in connection with the illustrated embodiments.

From the foregoing, the construction, and utility of the connectors will be apparent. It will therefore be recalled that the stress distribution is prescribed by a non-prismatic tooth profile and a tooth insertion force applied to a raised portion of the tooth base, causing curling of the tooth tip portion. The tooth profile may be varied in order to cause curling in different directions either edgewise as described with respect to FIGURES 13 and 14, or as described with respect to FIGURE 12. The degree of tooth curling may also be varied by changing the angular attitude of the tooth side edges to one another or by using curved tooth sides. By use of a double curved tooth surface, the tooth tip curling action is enhanced and the build up of wood surface stresses inhibited when axial load is applied to the structure members, because of the increased stiffness against bending produced by the double curvature. Surface wood stresses produced under axial loading of the structural member are also reduced by designing the tooth body with a base that is relatively wide relative to the tooth surface area. The curvature of the tooth normal to the tooth base provides additional resistance to indentation of the plate into the bearing area under the tooth penetration force and accentuates tooth tip curling by augmenting the unsymmetrical internal stress distribution. A connector tooth having the foregoing attributes may be formed from a flat connector plate by folding along the reentrant juncture curve so designed as to minimize metal tearing at the critical corner regions. The use of such a reentrant curvature for the juncture is also effective to form the double curvature for the tooth body aforementioned and to obtain the eccentric loading of the tooth by the embedding force applied to the plate portion which produces the resisting force distribution pattern that causes curling of the tip. Weakening of the tooth edge near the tip in conjunction with the location of the stress concentration would further enhance curling of the tip. Additional gripping action is obtained when the tip is split into pointed sections as shown in FIGURES 13 and 14. Because of the foregoing attributes of the connector teeth, in accordance with the present invention, a relatively short tooth may be utilized relative to the depth of the wood members being connected which nevertheless has a high resistance to withdrawal and tooth failure. Because the connector teeth of the present invention leave a considerable portion of the wood undisturbed, a stronger wood joint is obtained without any sacrifice in the strength of the structural members themselves.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A connector having a plate portion defining an abutment plane from which a plurality of teeth are struck, said teeth extending in one direction at substantially right angles to said plate for penetration of a structural material against which the plate portion is flattened, each of said teeth comprising, a rigid, elastically deformable member having a relatively wide base integrally joined to the plate portion and gradually tapering to a pointed tip remote from said plate portion, said teeth being substantially V-shaped in transverse cross-section throughout their length with the concave side of the teeth being directed toward the openings from which the teeth are struck, juncture means interconnecting the base to the plate portion for curling of the tip in response to said flattening of the plate portion against the structural material, said juncture means including a bearing point on said abutment plane at the center of said base and a load point adjacent each end of said base with the portions of said juncture means between the bearing point and each of the load points being curved to define a pair of arcuate junctures directed inwardly toward said openings, said load points being defined by portions of the plate being axially displaced from the abutment plane in a direction opposite to that in which the teeth extend, and transition body means interconnecting the base and the tip for developing an internal stress concentration at the tip relieved by curling thereof in response to said penetration of the structural material.

2. The combination of claim 1, wherein said body means includes a weakened portion disposed adjacent to the tip between said internal stress concentration and the maximum resisting stress in the structural material to augment curling of the tip.

3. In combination with a connector plate having a flat abutment surface, a non-planar tooth struck out from the plate substantially at right angles to said surface, said tooth being integrally connected to the plate along a juncture terminated by spaced load points on the plate, said plate being locally displaced at said load points from the abutment surface, said tooth having a non-prismatic body bounded by a base line connecting said load points and sides converging from the load points to an apex, said juncture being formed along two curve sections extending toward each other from the load points tangent to the base line and intersecting at the abutment surface between the load points.

4. The combination of claim 3 wherein said body is provided with a weakening aperture closely spaced from the tip portion to accentuate the stress concentrations adjacent the tip portion.

5. A connector having a plate defining an abutment plane from which a plurality of non-planar teeth are struck, said teeth extending transverse to the plane in one direction for penetration of a structural member against which the plate is flattened, each of said teeth comprising, a relatively rigid body having a base integrally joined to the plate and tapering to a pointed tip remote from said plate, said body having a double curvature throughout substantially the entire length thereof forming a transverse cross-section, the curvature of which decreases from the base to the tip, juncture means interconnecting the base and the plate for curling the tip only in response to said flattening of the plate against the structural member, said juncture means including a bearing point on said abutment plane and a load point spaced therefrom along the base on a portion of the plate axially displaced from the abutment plane.

6. The combination of claim 5 wherein said tip portion is split into two pointed sections.

7. A method of forming a tooth in a flat connector plate for penetration of a structural member comprising the steps of: cutting a tongue from the plate along two converging sides circumscribed by a circle intersecting an apex and a base of the tongue; folding the tongue along a reentrant curve on the plate tangent to the base at the intersections of the base with said circle and the two converging sides; and deforming the plate at said intersections to axially displace spaced portions of the plate at the intersections from the general plane of the plate.

8. The method of claim 7 wherein said step of folding the tongue includes displacement thereof to a position projecting laterally from the plate along a line extending between the apex of the triangle and a point of tangency between said reentrant curve and the circle circumscribing the triangle, and forming the tongue with a curvature diminishing from the base toward the apex.

References Cited

UNITED STATES PATENTS

| | | | |
|---|---|---|---|
| 1,621,213 | 3/1927 | Olson | 85—11 |
| 2,142,167 | 1/1939 | Zalkind | 85—38 |
| 2,293,862 | 8/1942 | Sorenson | 85—13 |
| 2,498,627 | 2/1950 | Hallock | 85—31 |
| 3,090,088 | 5/1963 | Foley et al. | 85—13 |
| 3,225,643 | 12/1965 | Couch | 85—13 |

CARL W. TOMLIN, *Primary Examiner.*

R. S. BRITTS, *Assistant Examiner.*